March 22, 1960     W. AMBRUSTER II, ET AL     2,929,503
AIR, WATER, AND DIRT ELIMINATOR AND SURGE TANK
Filed Dec. 6, 1956

INVENTORS
Watson Ambruster, II
Carl T. Vance, Jr.
BY George Renehan
Attorney 2,929,503

AIR, WATER, AND DIRT ELIMINATOR AND SURGE TANK

Watson Ambruster II, Albuquerque, N. Mex., and Carl T. Vance, Jr., Bristol, Tenn., assignors to the United States of America as represented by the Secretary of the Army Application December 6, 1956, Serial No. 626,783

5 Claims. (Cl. 210—120)

(Granted under Title 35, U.S. Code (1952), sec. 266)

The invention described herein may be manufactured and used by or for the Government of the United States of America for governmental purposes without the payment to us of any royalty thereon.

This invention relates to a combination air, water and dirt eliminator and surge tank for use in lines carrying gasoline, kerosene or other liquid hydrocarbons. It serves a dual purpose in that it acts as a purifier to eliminate air, water and dirt from the hydrocarbon and also as a surge chamber to suppress liquid hammer caused by the sudden closing of valves as well as surges caused by the starting of pumps, etc. It is so constructed that standard commercial filter elements may be employed and readily replaced.

Figure 1:
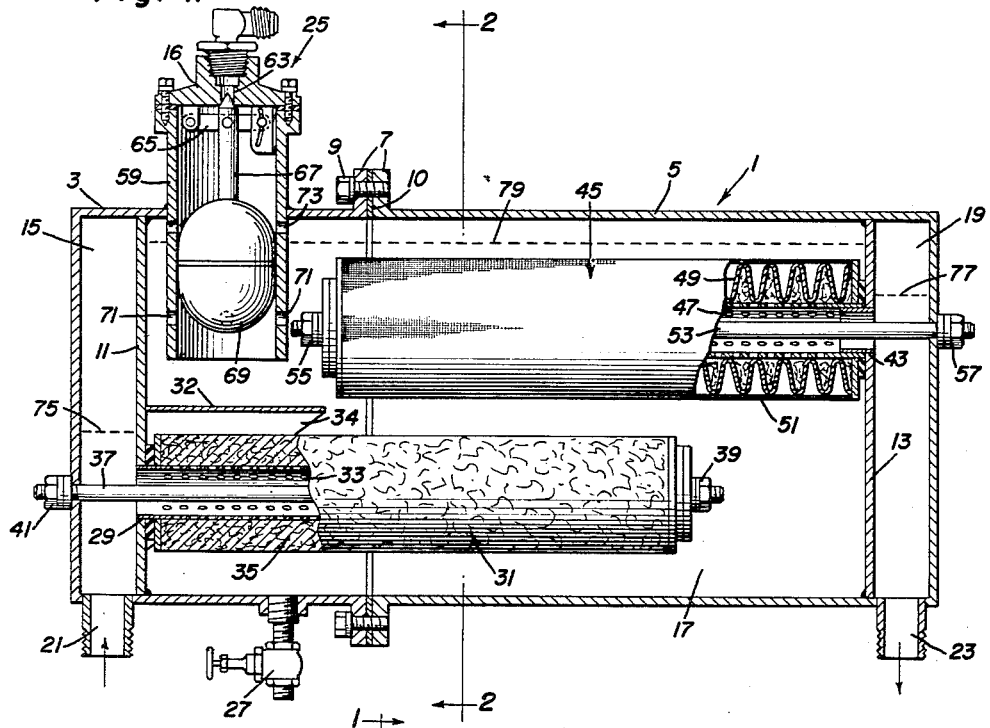

In the drawing: Fig. 1 is a longitudinal section taken on the line 1—1 of Fig. 2.

Figure 2:
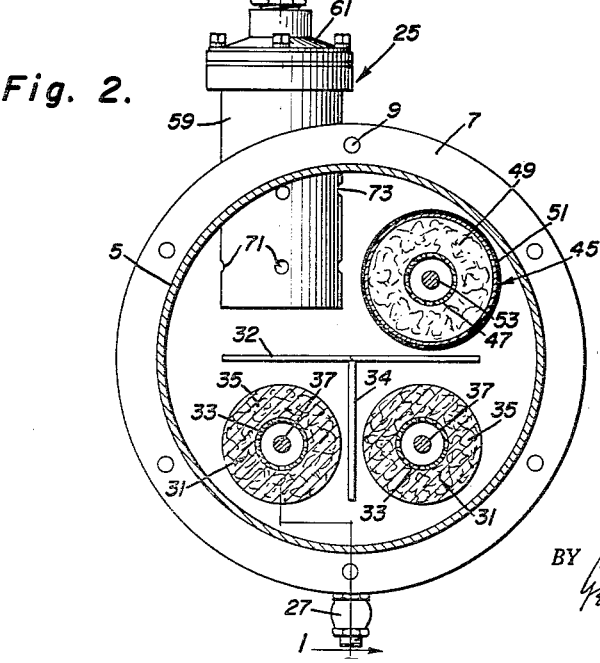

Fig. 2 is a transverse section taken on the line 2—2 of Fig. 1.

The device includes a substantially cylindrical main casing 1 formed of a head assembly 3 and a body assembly 5 joined by flanges 7 and bolts 9, and sealed by a gasket 10. The head assembly is divided by a vertical wall or partition 11 and the body assembly by a vertical wall or partition 13. These walls divide casing 1 into an inlet chamber 15, a main chamber 17 and an outlet chamber 19. An inlet 21 communicates with the bottom of inlet chamber 15 and an outlet 23 with the bottom of outlet chamber 19. An air eliminator valve assembly 25 communicates with the top and water eliminator valve 27 with the bottom of main chamber 17.

Partition 11 is provided in its lower portion with one or more feed openings 29 which communicate with one or more coalescer cartridges 31. Each of these cartridges comprises a central perforated tube 33 surrounded by a mass 35 of fibrous material, e.g. phenolic-resin-bonded glass fibers. They are held in place by central rods 37 provided at their inner ends with suitable nuts, washers, and retaining plates 39 engaging the inner ends of cartridges 31 and at their outer ends with suitable nuts and washers 41 engaging the end of head assembly 3.

Adjacent the coalescers 31 is a baffle system comprising a horizontal baffle 32 above the coalescer cartridges and a vertical baffle 34 between the cartridges. These baffles serve to reduce turbulence in the chamber.

Wall 13 is provided in its upper portion with one or more discharge openings 43, each of which communicates with a separator cartridge 45. The separator cartridge is formed by a central perforated tube 47 surrounded by a filter medium 49 of large surface area. For example, it may comprise an accordion-pleated tubular sheet of phenolic-resin-bonded cellulose. It should be rendered water repellent, e.g., by treatment with silicones. It may be surrounded by a cylindrical screen 51. Cartridge 45 is, like cartridge 31, supported by means of a central rod 53 provided at its inner end with nuts, washers and plates 55 and at its outer end with nut 57.

The cartridges 31 and 45 per se form no part of our invention, but are commercially available units. It is an advantage of our structure that the precise structure of these cartridges may be varied considerably, without changing the remainder of the device, so that replacement of these expandable parts is easy and so that advantage may readily be taken of improvements made by the manufacturers of such units.

Passage of the liquid through the fiber mass of coalescer cartridge 31 causes the water to coalesce into droplets, some of which are sufficiently large to sink at once to the bottom of chamber 17. Those which are carried along by the liquid are removed by the water-repellent filter 49. This mode of operation, i.e., coalescence followed by filtration, is disclosed in prior patents, e.g. 2,404,872, 2,597,475 and 2,525,154 and we do not claim it to be new with us.

The air eliminator valve assembly 25 includes a cylindrical riser 59 positioned extending through the upper portion of head assembly 3. It is provided with a removable cover plate 51 having a central bore 63. The plate also carries a guide linkage 65 which supports a needle valve 67 adapted to open and close bore 63. On the needle valve 67 is a float 69 which is mounted within the lower portion of riser 59. This lower portion is provided with perforations 71, 73 to permit free circulation of liquid and air. Baffles 32, 34 serve to reduce the effects of surges on the float 69.

The operation of the device is as follows. Liquid hydrocarbon containing, air, water, and solid impurities enters at 21. It rises to opening 29 and enters cartridge 31. It also rises in chamber 15 to a height determined by the liquid pressure, compressing the air. The liquid level is indicated arbitrarily at 75. Its actual position will vary considerably with operating conditions.

The liquid flows first through coalescer cartridges 31 where, as previously described, water is coalesced into droplets. The fiber mass 35 also acts as a filter, removing most of the solid impurities. Entrained or dissolved air is also released and rises to the top of chamber 17. The liquid then passes through separator cartridge 45 where water and any remaining solids are filtered out. It passes into outlet chamber 19 and out through outlet 23. If a substantial back pressure exists, air will be compressed in the outlet chamber, the liquid rising to a level above opening 43, to a level arbitrarily shown at 77.

In chamber 17 it is desired to maintain a liquid level 79 which is above opening 43. This is attained by means of the float-controlled air-eliminator valve assembly 25. Upon starting up, as long as the liquid level is below that line, needle valve 67 will be open, air will be displaced by the incoming liquid through bore 63 and the level will rise. When the desired level is reached float 69 will close needle valve 67 and any further liquid rise will compress the remaining air in chamber 17 and riser 59. During operation, entrained air which escapes from the liquid will force the liquid level down. When the desired level is reached, the lowering of float 69 will again open needle valve 67 and bleed the excess air.

It will be noted that air is trapped above the liquid in each of chambers 15, 17, and 19, particularly in chamber 15 where the openings 29 as well as inlet 21 are near the bottom. The device therefore acts as a surge tank for reducing the surge pressures or liquid hammer caused by sudden closing of a valve downstream of the device. The chamber 15 also serves to protect the coalescer and separator structure from surges caused by opening a valve or starting a pump upstream of the device or from pulsations if a reciprocating pump is employed.

While we have described our structure in detail, it will be apparent various changes are possible. We therefore desire our invention to be limited solely by the scope of the appended claims.

We claim:

1. A combined air, water and dirt eliminator and surge tank for liquid hydrocarbons comprising a substantially horizontal closed casing, a vertical wall dividing said casing into an inlet chamber and a main chamber and forming a first end of said main chamber, an inlet in the bottom of said inlet chamber, at least one feed opening in the lower portion of said wall, said inlet chamber being imperforate above said opening, a coalescer in said main chamber and in communication with said opening, said coalescer comprising a mass of fibrous material through which said liquid must flow in passing from said feed chamber to said main chamber, a second vertical wall forming a second end of said main chamber, at least one discharge opening in the upper portion of said second vertical wall, a vertical end wall spaced from said second vertical wall and forming with said second vertical wall an outlet chamber, an outlet in the bottom of said outlet chamber, a separator in said main chamber in communication with said discharge opening, said separator including a filter through which said liquid must pass in flowing from said main chamber to said discharge opening, a valve-controlled air eliminator in the upper portion of said main chamber and a valve-controlled water eliminator in the bottom of said main chamber.

2. A device as defined in claim 1 wherein said valve controlled air eliminator comprises a float-controlled valve so constructed and arranged as to close when the liquid level in said main chamber rises above a predetermined position and to open when said level falls below said position.

3. A device as defined in claim 1 in which each said coalescer and each said separator comprises an elongated horizontal cartridge.

4. A combined air, water and dirt eliminator comprising a substantially horizontal closed casing having two vertical end walls, a first and a second vertical partition spaced from said end walls, said first partition being spaced from one end wall to form therebetween an inlet chamber, said second partition being spaced from the other end wall to form therebetween an outlet chamber; said partitions forming with said casing a main chamber between said partitions, an inlet in said casing communicating with the bottom of said inlet chamber, an outlet in said casing communicating with the bottom of said outlet chamber, at least one opening in said first partition near the bottom thereof, said inlet chamber being imperforate above said opening, a substantially horizontal coalescer cartridge removably mounted in said main chamber in communication with said opening, said coalescer cartridge comprising a tubular mass of fibrous material through which liquid must flow in passing from said inlet chamber to said main chamber, said coalescer cartridge being spaced above the bottom of said main chamber, at least one opening in the upper portion of said second partition, a separator cartridge removably mounted in the upper portion of said main chamber in open communication with said last named opening, said separator cartridge comprising a tubular water-repellent filter through which liquid must flow in passing from said main chamber to said outlet chamber, a float-controlled air eliminator valve in said casing communicating with the top of said main chamber, said float-controlled air eliminator valve being so constructed and arranged as to close when the liquid level in said chamber rises above a predetermined position and open when said level falls below said position, and a water eliminator valve in said casing communicating with the bottom of said main chamber.

5. A device as defined in claim 4 and comprising a cylindrical riser through the top of said main chamber, said riser having a lower open end within said main chamber and a closed upper end above said main chamber, said upper end having a central bore, said air eliminator valve comprising a float within said cylindrical riser, a needle valve connected to said float and adapted to close said bore, and a guide linkage connected to said riser and said needle valve.

References Cited in the file of this patent

UNITED STATES PATENTS

| | | |
|---|---|---|
| 551,324 | Kohlmeyer | Dec. 10, 1895 |
| 812,831 | Davidson | Feb. 20, 1906 |
| 1,651,495 | Watson | Dec. 6, 1927 |
| 1,873,597 | Jones | Aug. 23, 1932 |
| 2,555,607 | Robinson | June 5, 1951 |
| 2,597,475 | Grise | May 20, 1952 |
| 2,601,903 | Erwin | July 1, 1952 |
| 2,609,932 | Fricke | Sept. 9, 1952 |
| 2,611,490 | Robinson | Sept. 23, 1952 |
| 2,657,808 | Mankin | Nov. 3, 1953 |
| 2,837,214 | Kasten | June 3, 1958 |

FOREIGN PATENTS

| | | |
|---|---|---|
| 155,109 | Great Britain | Dec. 16, 1920 |